United States Patent
Young

(10) Patent No.: US 7,040,350 B2
(45) Date of Patent: May 9, 2006

(54) PERFORATED PULSATION DAMPENER AND DAMPENING SYSTEM

(76) Inventor: Winston B. Young, 132 W. Chestnut Ave., Monrovia, CA (US) 91016

(*) Notice: Subject to any disclaimer, the term of this patent is extended or adjusted under 35 U.S.C. 154(b) by 0 days.

(21) Appl. No.: 10/422,978

(22) Filed: Apr. 23, 2003

(65) Prior Publication Data
US 2003/0226607 A1 Dec. 11, 2003

Related U.S. Application Data

(60) Provisional application No. 60/374,733, filed on Apr. 23, 2002.

(51) Int. Cl.
F16L 55/04 (2006.01)

(52) U.S. Cl. ............... 138/30; 138/28; 138/26; 220/721

(58) Field of Classification Search ............ 138/30, 138/28, 26, 32; 181/233; 220/720, 721
See application file for complete search history.

(56) References Cited

U.S. PATENT DOCUMENTS

| | | | | |
|---|---|---|---|---|
| 2,968,319 A | * | 1/1961 | Ball ............................. | 138/30 |
| 3,063,470 A | * | 11/1962 | Forster ........................ | 138/30 |
| 3,165,166 A | * | 1/1965 | Hall ............................ | 181/233 |
| 3,486,530 A | * | 12/1969 | Mercier ....................... | 138/30 |
| 3,621,882 A | * | 11/1971 | Kupiec ........................ | 138/30 |
| 3,741,250 A | * | 6/1973 | Mercier ....................... | 138/30 |
| 3,893,485 A | * | 7/1975 | Loukonen ..................... | 138/30 |
| 4,032,265 A | * | 6/1977 | Miller .......................... | 417/540 |
| 4,209,041 A | * | 6/1980 | Loukonen ..................... | 138/30 |
| 4,497,388 A | * | 2/1985 | Dexter ........................ | 181/233 |
| 4,732,176 A | * | 3/1988 | Sugimura ..................... | 138/30 |
| 4,759,387 A | * | 7/1988 | Arendt ......................... | 138/30 |
| 6,131,613 A | | 10/2000 | Jenski ......................... | 138/30 |
| 6,164,336 A | * | 12/2000 | Pasquet et al. ............... | 138/30 |

FOREIGN PATENT DOCUMENTS

SE 504964 C2 6/1997

* cited by examiner

Primary Examiner—Patrick Brinson
(74) Attorney, Agent, or Firm—Jeffer Mangels Butler & Marmaro, LLP

(57) ABSTRACT

Perforated pulsation dampening devices of this invention comprise a housing having a structural wall section with opposed ends defining an internal chamber. The housing is characterized by a plurality of openings disposed therethrough. A compressible member is disposed within the internal chamber and positioned to be contacted by fluid passed from an outside surface of the housing through at least one of the openings. The compressible member is configured to absorb a known fluid flow variation or pressure pulsation in the fluid contacting the compressible member to attenuate the same. If desired, a sleeve can be interposed between an inside surface of the internal chamber and an outside surface of the compressible member.

28 Claims, 7 Drawing Sheets

US 7,040,350 B2

PERFORATED PULSATION DAMPENER AND DAMPENING SYSTEM

RELATION TO COPENDING PATENT APPLICATION

This patent application claims priority of U.S. Provisional Patent Application No. 60/374,733 filed on Apr. 23, 2002.

FIELD OF THE INVENTION

This invention relates to pulsation dampeners as used to control unwanted pressure fluctuations in liquid flow within a fluid flow stream and, more particularly, to a pulsation dampener and dampening system comprising the same that is specially configured to control such unwanted pressure fluctuations by immersion within the fluid flow stream.

BACKGROUND OF THE INVENTION

Pulsation dampeners are devices known and used in the art for controlling unwanted pressure changes in a liquid within a fluid handling system. Such pressure changes are caused by sudden fluid flow changes that can be repeating, e.g., such as those caused by operation of a reciprocating positive displacement pump, or that can be single events, e.g., such as that caused by a pump start up or a sudden valve closure. The sudden acceleration or deceleration of a fluid in a pipeline by these events causes a flow variation, which is an uncontrolled form of kinetic energy that can be seen in pipe shock or vibration. This energy continues to rock back and forth in a fluid handling system until it dissipates through friction loss or causes damage to the fluid handling system itself. This occurs because fluids or liquids are not compressible.

Pulsation dampeners are devices known in the art that use potential energy to absorb these flow variations and smoothly meter out the fluid within the fluid transport system. Typically, pulsation dampeners are used to control repeated, cyclic or "pulsed" flow variations in a fluid transport system. However, pulsation dampeners can also be used to control a nonrepeated, single event or "surge" flow variation in a fluid transport system.

Pulsation dampeners known in the art typically comprise a nonperforated housing body that defines a fluid chamber therein. Fluid is directed into the chamber via fluid inlet opening in the housing. Pulsation dampeners can be configured having an "appendage" design, where the device is attached as an appendage to a designated fluid handling system. In an appendage design, the pulsation dampener housing body has a single opening to the chamber that serves as both a fluid inlet and a fluid outlet to provide two-way fluid flow through the device. Alternatively, pulsation dampeners can be configured having a "flow-through" design, where the dampener is attached in-line with the designated fluid flow device. In a "flow-through" design, the pulsation dampener housing body has a fluid inlet opening and a separate fluid outlet opening to accommodate one-way fluid flow through the device.

Known pulsation dampeners include a compressible member, e.g., an elastomeric bladder, disposed within the fluid chamber. The bladder is configured to occupy a desired volume in the chamber and is gas pressurized for the purpose of providing a desired degree of pulsation dampening. The bladder can be attached in some fashion to the chamber, and includes a pressure valve that is preferably accessible through the housing body for adjusting the bladder gas pressure externally from the housing.

Such pulsation dampeners are attached within a fluid transport system with the fluid inlet connected in fluid flow communication with the fluid being transported through the system. Most pulsation dampeners are installed inline with the suction and discharge piping or "teed" as an appendage. Appendage type pulsation dampeners are commonly used in a majority of applications characterized by low-frequency pulsed fluid flow variations due to their relatively low cost and ease of installation, e.g., they are usually teed into the piping system. The inherent design of such appendage type pulsation dampener operates to limit the practical, i.e., cost effective, effectiveness of the design in controlling high-frequency flow variations. Thus, "flow-through" type pulsation dampeners are most effective in fluid handling applications characterized by high-frequency pulsed fluid flow variations, as the flow through design provides a quickened or increased speed of response.

In an example application, an appendage type pulsation dampener is attached to a fluid transfer pipe downstream of a reciprocating pump, in communication with the fluid being passed through a fluid transport pipeline. In this service the pulsation dampener operates to control a sudden surge or pulsation of fluid flow in the fluid pipeline as follows. When a sudden surge or pulsation of fluid pressure exits the pump and enters the pipeline, it also enters the pulsation dampener chamber via the housing body fluid inlet. Within the chamber, the bladder operates to buffer or dampen the incoming flow variation in a manner that attenuates the flow variation through the remaining portion of the fluid transport pipeline coupled to the pulsation dampener.

Although such above-identified pulsation dampeners are widely used, they are not well suited for use in certain demanding fluid handling applications. An example of such a demanding fluid handling application is large-scale fluid handling, e.g., piping or other types of fluid handling systems that are characterized by high-frequency flow variations. As mentioned above, due to their inherent design, appendage type pulsation dampeners do not provide a sufficient speed of response to absorb the high-frequency flow variations. While flow-through type pulsation dampeners are sufficiently responsive in absorbing high-frequency flow variations, the large cost associated with making a sufficiently sized dampener for service in such large scale applications is economically prohibitive.

It is, therefore, desired that a pulsation dampening device be constructed in a manner capable of providing pulsation dampening service in demanding fluid handling applications characterized by high-frequency flow variations, calling for a dampening device having a rapid speed of response. It is also desired that such a pulsation dampening device be capable of being used with other such devices, if so desired and necessary, for purposes of providing a pulsation dampening system for use in addressing the pulsation dampening requirements of such demanding fluid handling applications.

SUMMARY OF THE INVENTION

Perforated pulsation dampening devices of this invention are constructed for immersion service within a fluid stream. As used herein, the term "immersion" is intended to mean that the device is used in a manner whereby the fluid stream is directed against or placed into contact with an outside portion of the device. The device need not be submerged in the fluid stream to operate as intended, only positioned so that the fluid stream be in communication with an outside portion of the device.

Perforated pulsation dampening devices of this invention comprise a housing having a structural wall section with opposed ends defining an internal chamber. In an example embodiment, the structural wall can be cylindrical and at least one of the ends removably attached thereto. The housing is characterized by a plurality of openings disposed therethrough. In an example embodiment, these openings are disposed through the structural wall section of the housing.

The perforated pulsation dampening device includes a compressible member disposed within the internal chamber and positioned to be contacted by fluid passed from an outside surface of the housing through at least one of the openings. The compressible member is configured to absorb a known fluid flow variation or pressure pulsation in the fluid contacting the compressible member to attenuate the same. In an example embodiment, the compressible member is provided in the form of a gas-filled elastomeric bladder. The bladder is preferably configured in the same shape as the internal chamber to fit conformingly within the same. The Bladder is preferably attached to the housing and includes means for permitting gas adjustment from outside of the internal chamber. If desired, a sleeve can be interposed between an inside surface of the internal chamber and an outside surface of the compressible member.

When placed within a fluid flow stream, fluid enters the device via the plurality of openings and is placed into communication with the bladder. The bladder is charged with gas as needed to absorb the pressure pulsations by compression action, and thereby attenuate the pressure pulsations in the fluid stream. Configured in this matter, devices of this invention are able to provide pulsation dampening service in demanding fluid handling applications, such as those characterized by high-frequency flow variations, calling for a dampening device having a rapid speed of response, and large scale applications where use of conventional appendage or flow-though dampeners are not economically feasible.

BRIEF DESCRIPTION OF THE DRAWINGS

The invention will be more clearly understood with reference to the following drawings wherein.

DETAILED DESCRIPTION

Pulsation dampening devices of this invention are specially constructed for use in demanding pulsation dampening fluid handling applications calling for rapid response characteristics, e.g., large scale applications characterized by high-frequency fluid flow variations. Such pulsation dampening devices generally comprise a cylindrical housing body that defines a fluid chamber therein and that comprises a plurality of fluid flow openings disposed through a structural wall defining the body and passing to the fluid chamber. A compressible member, e.g., an elastomeric gas pressurized bladder, is contained within the chamber for absorbing the flow variations of fluid entering the device via the plurality of openings.

Configured in this manner, pulsation dampening devices of this invention are uniquely adapted for immersion service and are placed directly into the flow stream of the pressurized fluid, such that the pressurized fluid enters and exists the device by passing through the plurality of fluid flow openings. This immersion oriented design provides responsive pulsation dampening operation in demanding applications where the system fluid is characterized by a high pulsation frequency.

Figure 1:
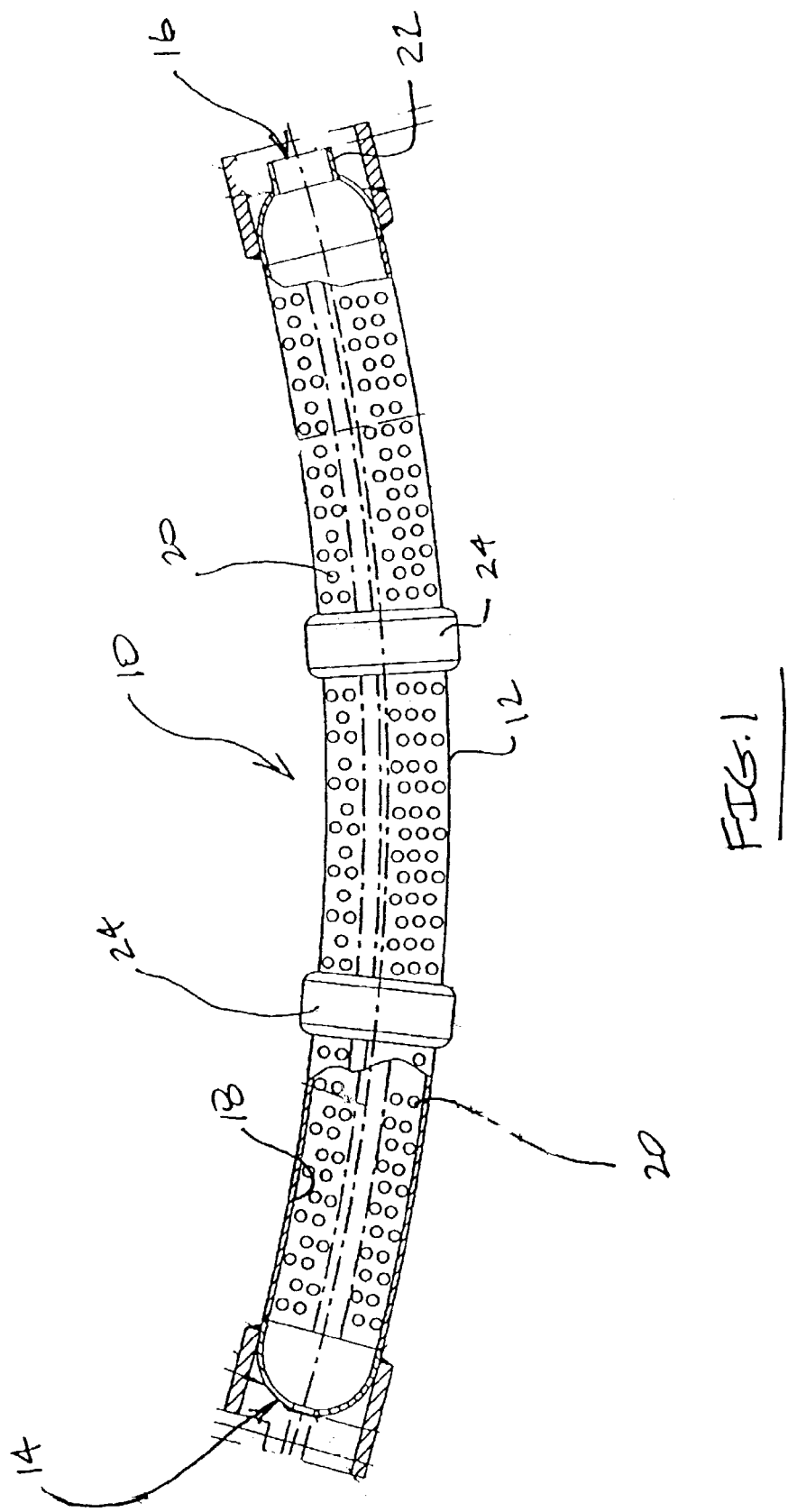
FIG. 1 is a schematic side elevation of a pressure dampening device shell assembly as constructed according to principles of this invention.

FIG. 1 illustrates an example pulsation dampening device 10 of this invention comprising a generally cylindrical housing body or shell 12. The shell is preferably formed from a structurally rigid material such as metal and the like. The shell includes a gas end 14 at one axial end, and a fluid end 16 at an opposite shell axial end. The shell defines a chamber 18 disposed therein that generally extends from the gas end to the fluid end. The shell includes a plurality of fluid flow openings or ports 20 that extend through the structural shell wall from an outside shell surface to the chamber, and that are positioned throughout the surface area of the shell. Thus, the shell is perforated with a plurality of fluid flow openings 20.

It is to be understood that the size and number of the fluid flow openings 20 can vary depending on the particular pulsation dampening device application. The size of the openings represents a compromise between achieving optimal pulsation dampening response and reducing unwanted pressure losses associated with the system fluid passing in and out of the device through the openings (the response increases and pressure losses lessen with increasing opening size or opening surface area), and controlling or limiting unwanted extrusion of a compressible member within the device outwardly through the openings from its placement within the chamber (the potential for extrusion increases with increasing opening size or opening surface area).

The particular patterning of the openings along the shell can vary. However, it is generally desired that the openings be equally spaced apart from one another for the purpose of equally distributing the pressure forces imposed onto the shell over the maximum surface area of the shell, thereby reducing unwanted material stresses thereon.

Figure 5:
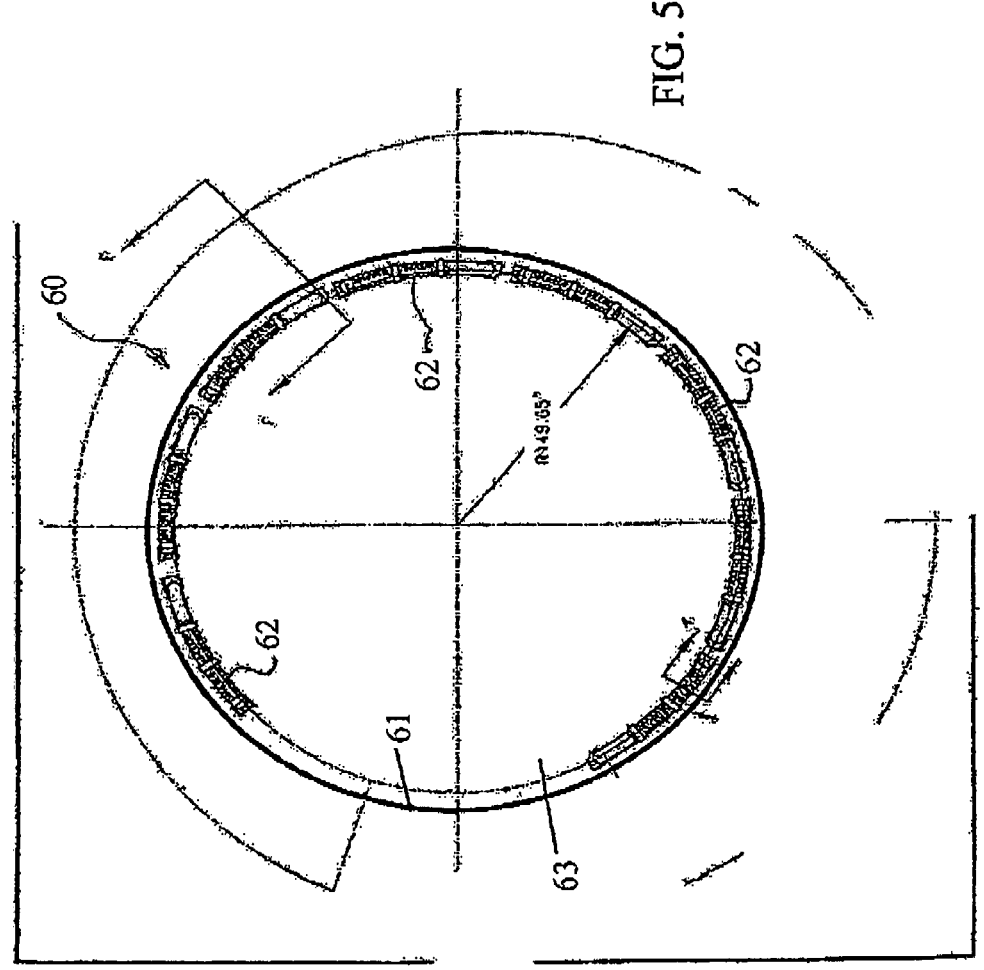
FIG. 5 is a schematic plan view of a pulsation dampening system comprising a number of pulsation dampening devices constructed according to principles of this invention.

It is also to be understood that the exact shell configuration can and will vary depending on the particular pulsation dampening device application. For example, the device illustrated in FIG. 1 comprises a shell having a curved or bowed configuration. This particular shape is provided to enable placement of the device in a particular fluid handling apparatus, as illustrated in FIG. 5, and is not intended to be limiting. Thus, it is to be understood within the scope of this invention that the pulsation dampening devices of this invention can be configured having a shape other then as described and illustrated without departing from the spirit of the invention.

In an example embodiment, where the pulsation dampening device is configured for use in the particular application illustrated in FIG. 5, the shell is configured having a curved shaped defined by a radius of curvature of approximately 3.8 meters (m). Such example device shell has a length of approximately 1.78 m, as measured from the shell gas end 14 to a collar 22 that is disposed around the shell fluid end 16, and a diameter of approximately 219 millimeters (mm). Such example shell comprises approximately 7,500 fluid flow openings that are each sized having a diameter of approximately 5 mm. In such example embodiment, the shell is formed from stainless steel.

The device 10 may include one or more support rings 24 disposed circumferentially around an outside surface of the shell for purposes of providing a supporting structure for accommodating mounting or attachment of the device to another structure. The support rings can be integral with or separate from the shell structure. The exact placement and number of support rings can and will vary depending on the particular size and application of the device.

Figure 2:
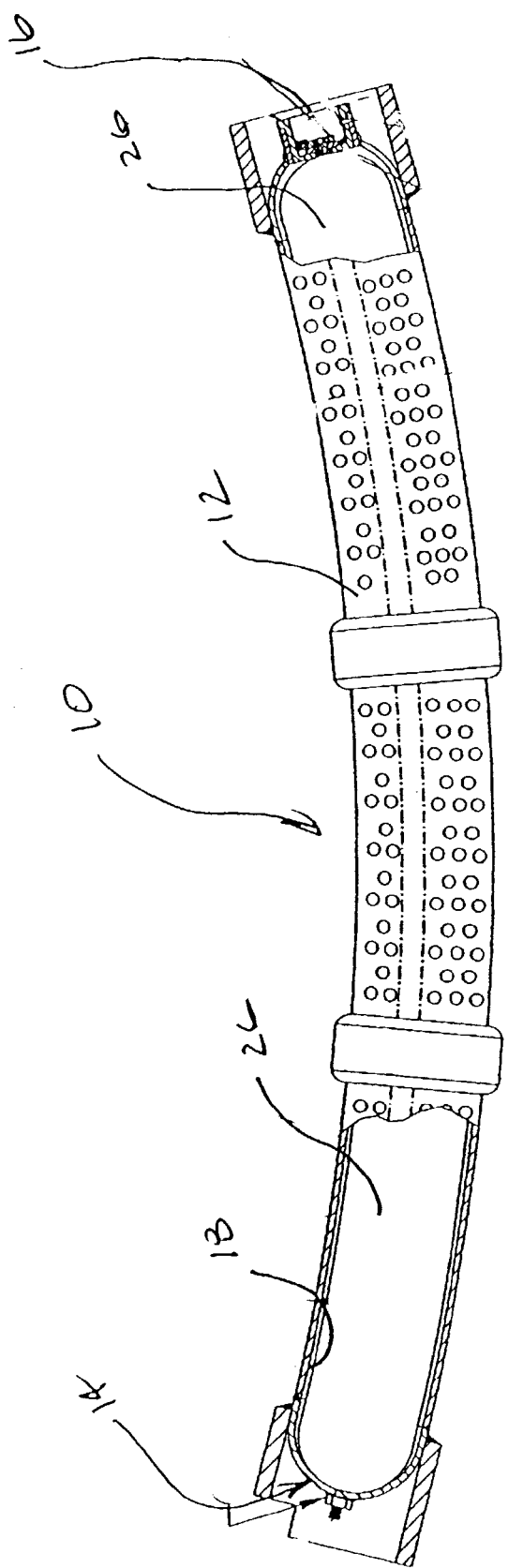
FIG. 2 is a schematic side elevation of the pressure dampening device of FIG. 1, further illustrating in cut away a bladder as contained within the device and as constructed according to principles of this invention.
Figure 3:
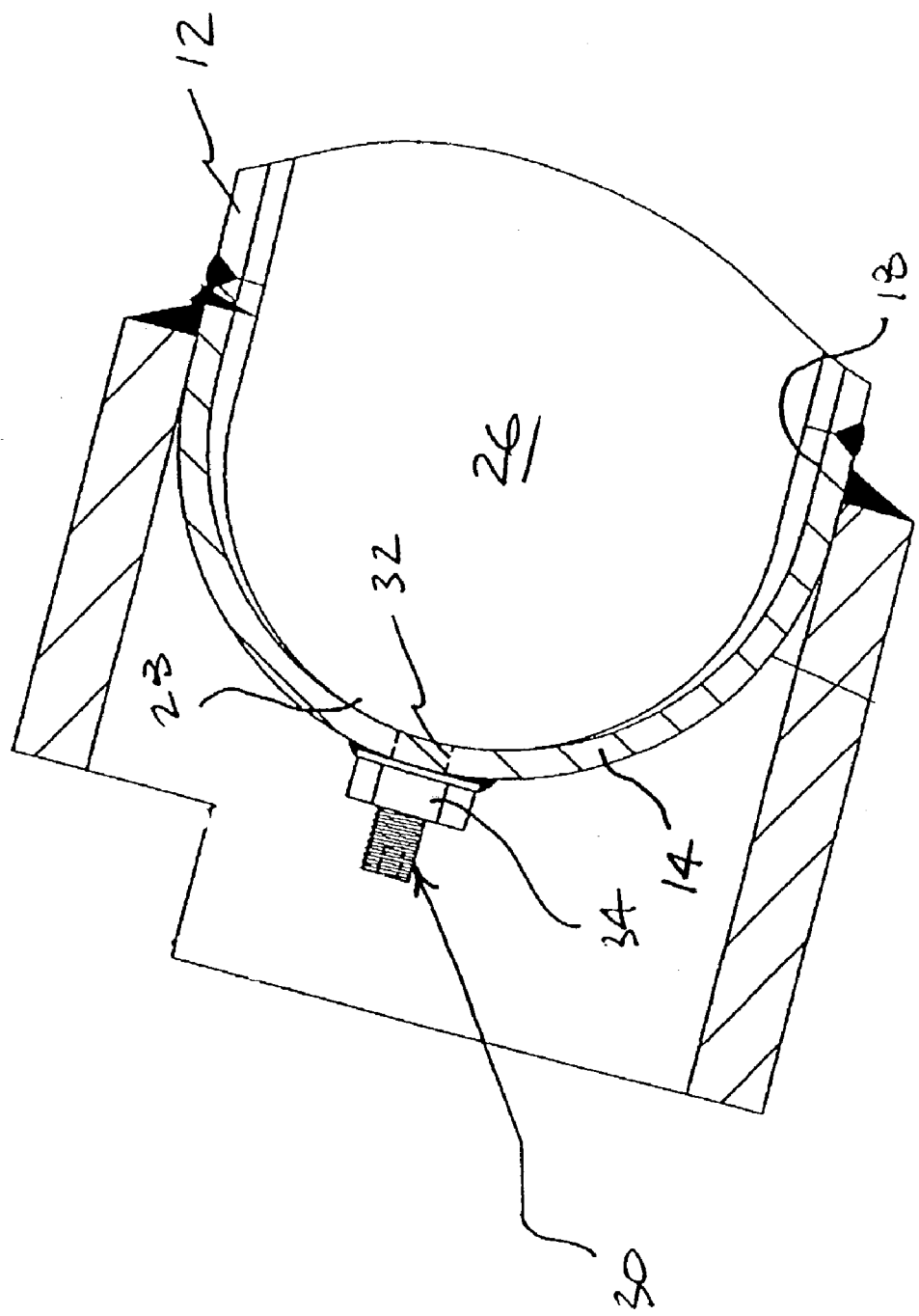
FIG. 3 is an enlarged first section of the pressure dampening device of FIG. 2.

FIG. 2 illustrates the pulsation dampening device of this invention comprising a compressible member 26 disposed within the shell chamber 18. The compressible member can be in the form of a sleeve, diaphragm, bellow, bladder, combination of the same, and the like that is flexible and that functions to accommodate a desired gas precharge pressure and isolate the same from the shell body and fluid flow openings. In a preferred embodiment, the compressible member is in the form of an elastomeric bladder.

Figure 6:
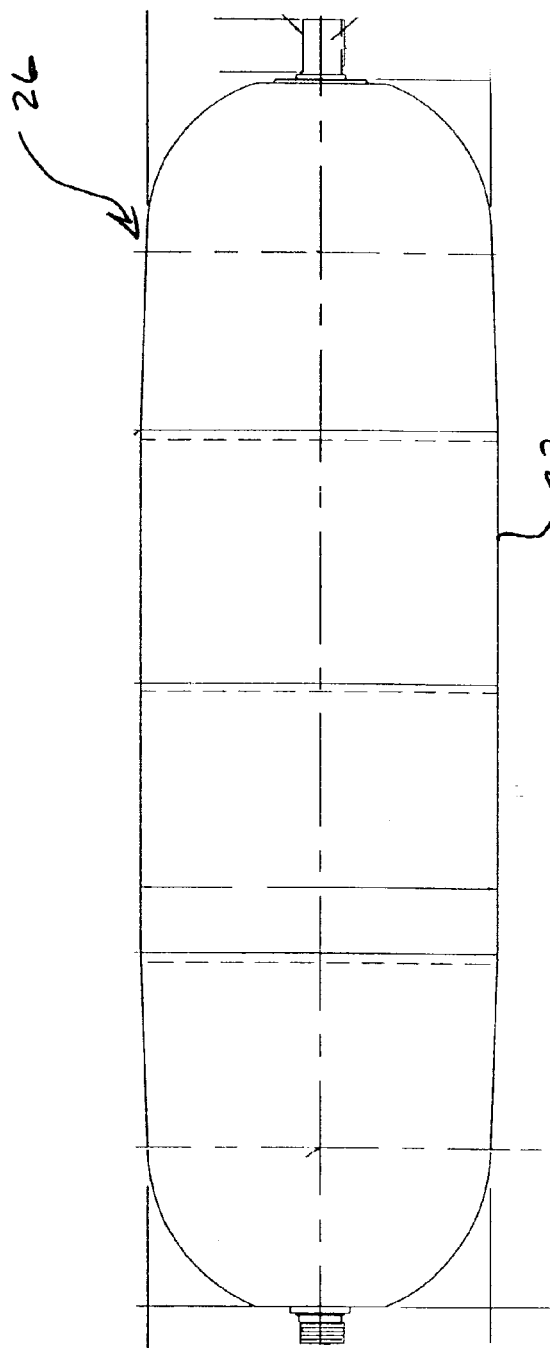
FIG. 6 is a schematic side elevation of the bladder as contained within the device and as constructed according to principles of this invention.

The bladder 26 is formed, e.g., molded, from the group of elastomeric materials used to make bladders in known pulsation dampeners, and extends axially within the chamber from the shell gas end 14 to the shell fluid end 16. In an example embodiment, the bladder is formed from buna-n rubber. Referring to FIG. 6, the bladder is sized and shaped to fit within and substantially occupy the volume of the chamber when it is precharged to a desired operating pressure. In the example embodiment illustrated, the bladder comprises a generally cylindrical body portion 27 that extends axially from one radiused bladder end to an opposite radiused bladder end. The bladder can be formed from one or more different portions that are joined together by conventional technique to provided the desired overall bladder configuration. In an example embodiment, the bladder is sized having a length of approximately 1.7 m, a diameter of approximately 187 mm, and having a wall thickness of approximately 3 mm, wherein these measurements are taken with the bladder not installed within the shell and with a 34.5 kilopascal gas pressure.

When pressurized to a desired gas precharge pressure, the bladder expands within the chamber such that the bladder's outside surface is pressed into contact with an adjacent inside surface of the shell chamber. It is, therefore, desired that the fluid flow openings through the shell be sized to control or limit possible extrusion of the bladder wall through the openings when precharged. The size of the openings is determined by the fluid stream operating pressure and frequency of pulsation, and by the material properties of the bladder membrane.

Figure 8:
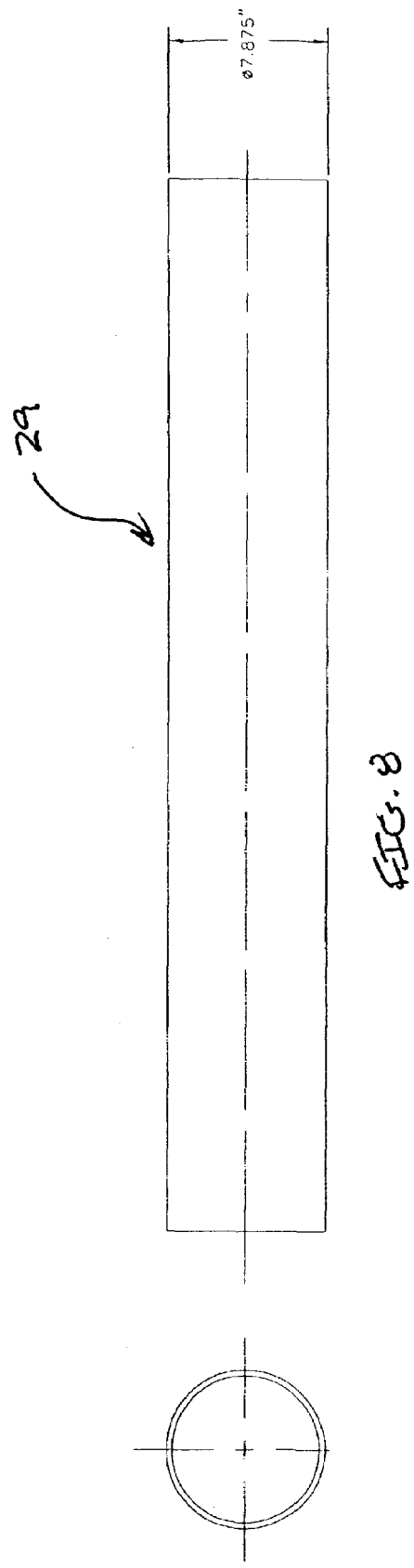
FIG. 8 is a schematic side elevation of a sleeve for the bladder as contained within the device and as constructed according to principles of this invention.

Alternatively, referring now to FIG. 8, a sleeve 29 can be used in conjunction with the bladder to protect the bladder from possible extrusion through the shell wall openings. The sleeve can be formed from the same general type of elastomeric materials used to form the bladder, and is sized having a sufficient length to cover a desired portion of the bladder, having an outside diameter capable of fitting within the chamber, and having an inside diameter capable of fitting over the bladder. In an example embodiment, the liner is sized having a length that covers a substantial length of the bladder, e.g., having a length of approximately 1.6 m, and having an outside diameter of approximately 200 mm. In a preferred embodiment, the sleeve is formed from buna-n rubber and has a wall thickness of approximately 3 mm.

As best illustrated in FIGS. 3, 4, 7A and 7B, the bladder 26 disposed within the chamber is attached at one or more of its ends to the shell 12. In a preferred embodiment, the bladder 26 is attached at both of its axial ends to the chamber. This is done to limit unwanted movement or twisting of the bladder within the chamber during operation. Looking at FIGS. 3 and 7A, a first bladder end 28 comprises a valve stem 30, e.g., a 6.35 mm NPT (F) port opening, that extends axially outwardly from the bladder through an opening 32 in the shell gas end 14. The valve stem is molded, e.g., vulcanized, to the bladder and permits gas-flow communication to the internal volume of the bladder through a center hole. The valve stem 30 has a threaded outside surface that extends from the shell opening 32, and provides a first attachment point for the bladder by threaded coupling with a nut 34. The valve stem 30 serves both as a means for pressurizing the bladder and as a means for attaching the bladder to the shell.

Figure 4:
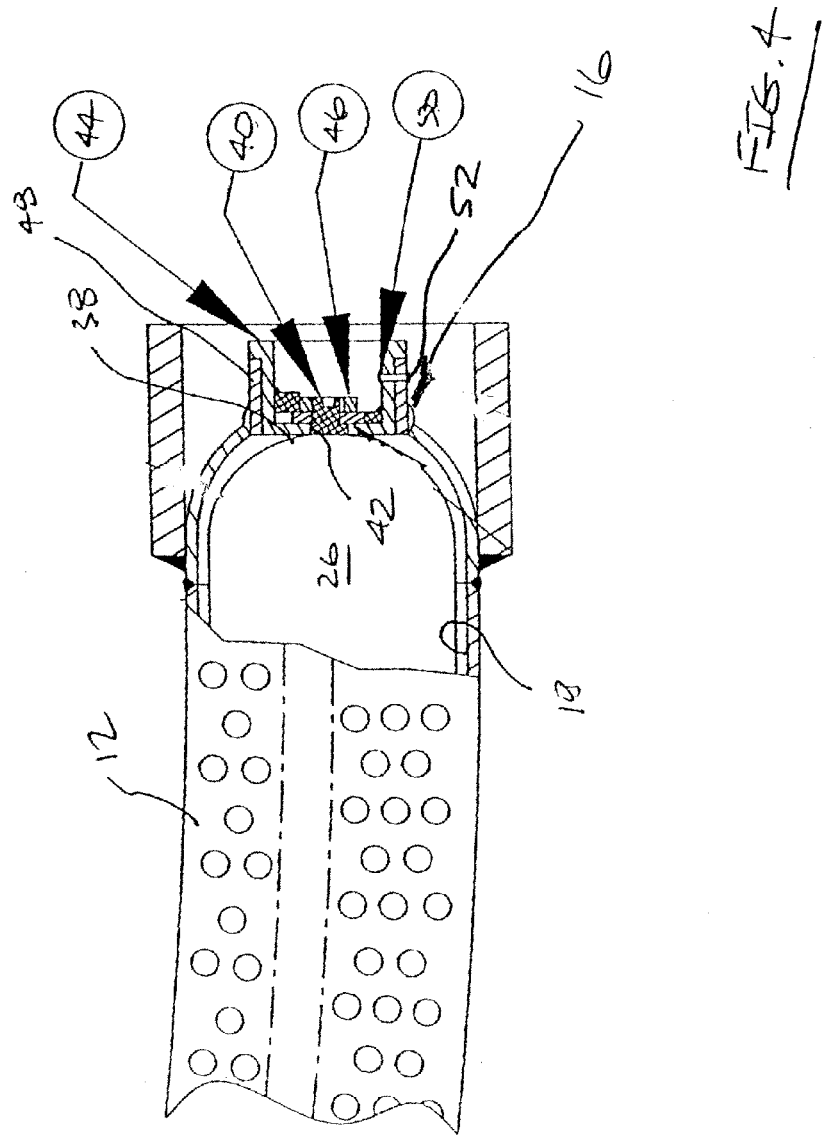
FIG. 4 is an enlarged second section of the pressure dampening device of FIG. 2.
Figure 7A:
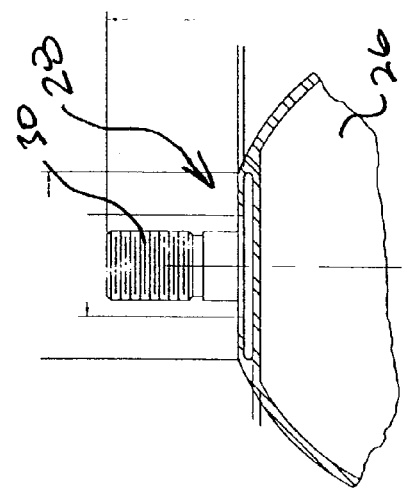
FIGS. 7A and 7B are enlarged cross-sectional side elevational views of end portions of the bladder of FIG. 6.
Figure 7B:
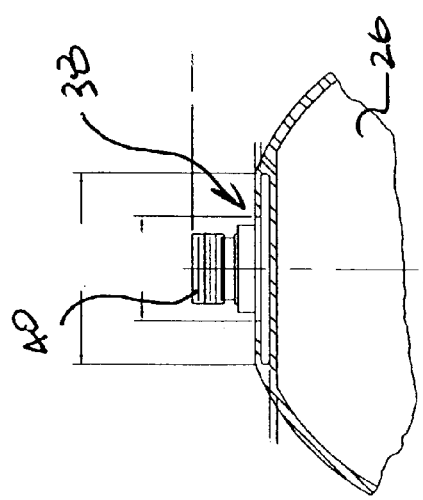

Referring now to FIGS. 4 and 7B, a second bladder end 38 comprises a button insert 40 that projects axially outwardly away from the bladder through an opening 42 disposed within a fluid plug 44 that is coupled to the fluid end 16 of the device. The button insert 40 is molded to the bladder and has a threaded outside surface that extends from the shell opening 42, and that provides a second attachment point for the bladder by threaded coupling with a nut 46. The bladder is sized having sufficient length to permit attachment at both ends without needing to be stretched or inflated.

The bladder is installed into the shell through the fluid opening 16, after which the fluid plug 44 is threaded into place within a fluid collar 48 that is disposed around and welded to the shell fluid end 16. Pins 50 and 52 are used to further secure the fluid plug 44 to the collar 48 for purposes of preventing unwanted loosening due to shock and vibration during device operation. After the bladder has been installed, and the fluid plug fastened to the collar, it is inflated with an initial gas precharge. This gas precharge is normally set at 70% to 90% of the fluid operating pressure.

Once the bladder is precharged to a percentage of the operating pressure, the system fluid can be placed into contact with the device such that the fluid is allowed to contact the shell and enter the shell chamber via the plurality of openings/perforations. When the fluid pressure builds to overcome the gas precharge, the bladder can then operate to absorb and discharge fluid through the shell perforations to attenuate fluid fluctuations and thereby dampen the pressure pulsations.

Although use of a bladder having dual or two attachment points has been discussed and illustrated, it is to be understood that the exact number of bladder attachment points can vary depending on the particular pulsation dampening device configuration and application. However, when used in certain demanding applications, such as that described below and illustrated in FIG. 5, it is desired that the bladder be attached at both ends to prevent possible damage from occurring to the bladder from unchecked or unlimited axial movement within the shell chamber in response to imposed fluid pressure forces. Thus, the so configured bladder is constructed to withstand the forces of fluid turbulence by such dual attachment, permitting only radial movement from gas compression and expansion.

FIG. 5 illustrates a pulsation dampening system 60 comprising a number of pulsation dampening devices 62 of this invention arranged in a specific manner to provide desired pulsation dampening operation. In this particular application, the pulsation dampening devices 62 are each positioned circumferentially around an inside surface 61 of a spiral case positioned downstream of a water turbine generator discharge. Hydroelectric plants use water turbines, which discharge water into penstocks. An interim chamber 63 between the water turbine and the penstock is called a spiral case. The spiral case is configured internally like a nautilus with a tapered helical spiral extending from a larger top opening to a smaller bottom discharge.

In this particular application, the spiral case has a diameter of approximately 7.29 m, and has a spiral internal configuration so that the fluid, i.e., water, discharged from the turbine passes in a helical or spiral fashion downwardly through the chamber and onto the pulsation dampening devices 62. Within this spiral case, the fluid carries pressure variations that have been created by the operation of the water turbine, as a result of the turbine blade passes. The turbine blades generate a flow variation which results in a pressure fluctuation.

The frequency of this generated flow variation is a function of the rotational speed and the number of turbine blades. The resulting pressure fluctuation or pulsation creates an undesired noise and vibration throughout the water passage and surrounding area. The water flow exiting the turbine in this application is characterized by pulsations created by turbine blade perturbations having a frequency of approximately 90 HZ, which causes unwanted noise and vibration throughout the operating plant that ultimately limits the operational capacity of the turbine.

A number of gas-charged pulsation dampening devices 62 of this invention are installed at the spiral case entrance for the purpose of absorbing the above-described high-frequency fluid flow variations created by the turbine blades, thereby controlling the wanted pressure pulsations and related noise. In order to be effective in reducing the flow variation produced by the water turbine blades, each dampening device and contained gas-charged bladder is immersed in the flow stream of the water passage.

To work effectively, each device is positioned so that the fluid enters and exits the gas-charged volume of the device to utilize the compression of the gas media. Losses associated with the flow entering and exiting this region limits the responsiveness of the design. If these losses exceed the fluid flow variations produced by the turbine the dampener becomes totally ineffective in attenuating the variations.

Perforated pulsation dampeners of this invention are installed in the water chamber 63 and fluid is allowed to enter and exit through the numerous fluid flow openings lining each damper shell. These openings are sized, configured, and numbered to provide a large enough flow area to reduce the pressure drop associated with entrance and exit losses through circular fluid openings.

In order to prevent the compressible member, e.g., the gas-charged bladder or separator, from extruding through these openings from the pressure caused by an initial precharge, the opening hole size and pattern must be designed to reduce the stresses on the rubber or separating material. This pattern and opening hole size is determined by static testing of membrane samples at various pressures and thickness. Additionally, the number of openings through the dampener shell must be enough to accept the displaced volume of each turbine perturbation without significant pressure drop losses but not allow the membrane separating the gas from the fluid to be overstressed. In a preferred embodiment, for this particular application, each damper is comprises the above-described sleeve interposed between the bladder and shell chamber wall to protect the bladder from unwanted damage caused from contact with the chamber wall surface.

The sizing calculation used for purposes of determining the actual volume of gas necessary to attenuate the flow variation is governed by Boyle's Law of Gases.

In this example application, perforated pulsation dampening devices of this invention are installed in an end-to-end configuration, forming a circular arc around the inside diameter 61 of the spiral chamber. To reduce the fluid losses associated with the dampener body being in the flow stream, the shell must be curved to fit the water passage inside diameter. The circumferential arc is composed of a number of independent units to allow for redundancy from membrane failure. In this particular application, a total of 8, 56.77 liter pulsation dampening devices are used, covering approximately 270 degrees of the 7.26 m diameter water chamber.

Deflector plates can be used to provide a desired fluid flow path onto the pulsation dampening devices. In this example application, deflection plates are positioned to prevent the water from directly impinging on the pulsation dampening devices. Each dampening device is attached to the water chamber by welded brackets or the like, allowing direct mounting to the water chamber's inside diameter. The pulsation devices are welded in place allowing enough space for accessibility of the bladder. The bladders used in this particular application are formed from a nitrile rubber, and are of a nitrogen gas-charged design.

The water pressure in the chamber is approximately 307 megapascals, and is flowing at a rate of approximately 184 cubic meters per second. The perturbation that the turbine blades produce upstream of the spiral case is plus or minus 137.9 kilopascals. Reduction of this pressure variation reduces the operating noise and vibration in the generating plant. The goal in designing a system incorporating the pulsation dampening devices of this invention was to reduce the variation to plus or minus 27.6 kilopascals or 1% of the operating pressure.

Compression of the gas-charged bladder allows for absorption of the water that creates the pressure fluctuation. By calculations it was determined that approximately 4.05 liters of water created the 137.9 kilopascal pressure fluctuation. Because water is an incompressible medium, the gas-charged bladder in the device was designed to compress this fluid volume change to prevent the creation of the pressure variation. The fundamental frequency of the turbine blade beat was 90 HZ.

A key feature of perforated pulsation dampeners of this invention is their ability to absorb high-frequency fluid flow variations while being immersed in a fluid flow stream, e.g., in a turbine discharge. Thereby, making dampeners of this invention well suited for large scale applications where use of conventional flow-through design dampeners would be cost prohibitive. The immersion design of this dampener is characterized by a quickened response time that is well suited for dampening high-frequency flow variations, wherein the quickened response time is provided by the plurality of fluid flow openings and the low fluid pressure drop losses associated with the same. Perforated pulsation dampeners of this invention are well suited for use in such applications as water distribution systems, fire protection systems, hydroelectric generation plants, and general industrial applications where immersion use is practical due to the size of the pipeline or fluid passage.

Although specific embodiments and illustrations of perforated pulsation dampening devices and dampening systems comprising the same have been specifically described and illustrated above, it is to be understood within the scope of this invention that the dampening devices constructed according to principles of this invention can vary depending on the specific application, and that such variation is intended to be within the scope of this invention.

What is claimed is:

1. A pulsation dampening device comprising:
   a housing having a cylindrical structural wall section defining an outermost surface of the device, the structural wall section having opposed ends defining an internal chamber;
   a plurality of openings disposed through the structural wall section; and
   a compressible member disposed within the internal chamber and positioned adjacent an inside surface of the structural wall section;
   wherein the structural wall section is curved between opposed ends and has a radius of curvature sized for attachment circumferentially along an inside surface of a cylindrical fluid chamber for immersion within a fluid flow stream passed through the fluid chamber, and wherein fluid that passes axially through the fluid chamber passes into the housing through at least one of the openings.

2. The pulsation dampening device as recited in claim 1 wherein the compressible member is a gas-filled bladder formed from an elastomeric material.

3. The pulsation dampening device as recited in claim 2 wherein the bladder is attached to the housing at one of its axial ends.

4. The pulsation dampening device as recited in claim 2 wherein the bladder includes a valve that extends through the housing to permit adjustment of gas pressure from outside of the internal chamber when the bladder is disposed within the internal chamber.

5. The pulsation dampening device as recited in claim 1 wherein at least one of the housing ends is removable to permit installation of the compressible member therein.

6. The pulsation dampening device as recited in claim 1 wherein the compressible member is cylindrical in shape prior to placement within the internal chamber.

7. The pulsation dampening device as recited in claim 1 wherein the compressible member is disposed within the internal chamber such that an outside surface of the compressible member is positioned adjacent an inside surface of the internal chamber and the plurality of openings, and wherein the fluid in the fluid chamber is passed to the device in a direction that is substantially perpendicular to the structural wall section.

8. The pulsation dampening device as recited in claim 1 further comprising a sleeve interposed between an inside surface of the internal chamber and an outside surface of the compressible member.

9. A pulsation dampening system comprising a number of the pulsation dampening devices as recited in claim 1 positioned end-to-end with one another circumferentially around the inside surface of the fluid chamber so that each device housing is placed into contact with the fluid stream passing through the fluid chamber.

10. A pulsation dampening device for dampening pulsations of a fluid stream transported within a fluid chamber, the device being immersed within the fluid stream and mounted to the fluid chamber, the device comprising:
    a housing having a cylindrical structural wall section defining an outermost surface of the device that is immersed in the fluid stream, the wall section including opposed axial ends defining an internal chamber, and the wall section being curved between opposed ends and being defined by a radius of curvature that is approximately that of a curved inside surface of the fluid chamber;
    a plurality of openings disposed through the structural wall section for passing fluid being transported through the fluid chamber to and from the internal chamber; and
    a gas-filled bladder disposed within the internal chamber and positioned adjacent an inside surface of the structural wall section to be contacted by fluid passed into the internal chamber through the openings, the bladder being formed from an elastomeric material and having a cylindrical shape prior to being placed within the internal chamber.

11. The pulsation dampening device as recited in claim 10 further comprising a sleeve interposed between an inside surface of the internal chamber and an outside surface of the bladder.

12. The pulsation dampening device as recited in claim 10 wherein the bladder is attached to the housing at one of its axial ends.

13. The pulsation dampening device as recited in claim 10 wherein the bladder is attached to the housing at each of its axial ends.

14. The pulsation dampening device as recited in claim 10 wherein the bladder includes a valve that extends through the housing to permit adjustment of gas pressure from outside of the internal chamber when the bladder is disposed within the shell.

15. The pulsation dampening device as recited in claim 10 wherein at least one of the housing ends is removable to permit installation of the bladder therein.

16. The pulsation dampening device as recited in claim 10 wherein the bladder is disposed within the internal chamber such that an outside surface of the bladder is positioned adjacent an inside surface of the internal chamber and the plurality of openings.

17. A pulsation dampening device for dampening pulsations of a fluid stream transported within a fluid transport chamber, the device comprising:
    a housing having an outermost structure having a cylindrical wall section with opposed axial ends defining an internal chamber, wherein at least one of the ends is removably attached thereto, wherein the cylindrical wall section is curved between the opposed ends and has a radius of curvature to accommodate attachment adjacent a cylindrical inside wall structure of the fluid transport chamber, the housing being immersed within fluid being passed through the fluid transport chamber;
    a plurality of openings disposed through the structural wall section for passing fluid transported through the fluid chamber to and from the internal chamber; and
    a gas-filled bladder disposed within the internal chamber and positioned therein to be contacted by fluid passed into the internal chamber through the openings, the bladder being formed from an elastomeric material and having a cylindrical shape prior to being placed within the internal chamber, the bladder being attached at one of its axial ends to the housing and being disposed within the internal chamber such that an outside surface of the bladder is positioned adjacent an inside surface of the internal chamber and the plurality of openings.

18. The pulsation dampening device as recited in claim 17 further comprising a sleeve interposed between an inside surface of the internal chamber and an outside surface of the bladder.

19. The pulsation dampening device as recited in claim 17 wherein the bladder includes a valve that extends through the housing to permit adjustment of gas pressure from outside of the internal chamber when the bladder is disposed within the shell.

20. A method for dampening pressure pulsations in a fluid stream being transported through a fluid chamber comprising the steps of:
    passing a fluid stream having pressure pulsations through a fluid chamber and onto an outermost surface of a pulsation dampening device that is immersed in the fluid stream, the outermost surface comprising a cylindrical wall structure extending axially between opposed axial ends and having a plurality of openings disposed through the wall structure, the device including an internal chamber defined radially by an inside surface of the cylindrical wall structure and defined axially by the ends, the cylindrical wall structure being curved between the ends and being attached to a cylindrical wall structure of the fluid chamber to extend along a circumferential section of the wall structure, and a compressible member disposed within the internal chamber, wherein the pulsation dampening device is attached within the fluid chamber in a direction that is substantially perpendicular to the fluid stream; and
    placing fluid from the fluid stream into communication with the compressible member by passage of the fluid through the openings, whereby the compressible member operates to absorb the pressure pulsations and thereby attenuate the pressure pulsations in the fluid stream.

21. The method as recited in claim 20 wherein the compressible member is a gas-filled bladder that is formed from an elastomeric material.

22. The method as recited in claim 21 wherein the bladder includes a valve that extends through the outermost surface of the device to permit adjustment of gas pressure from outside of the internal chamber.

23. The method as recited in claim 20 wherein the compressible member is cylindrical in shape prior to placement within the internal chamber.

24. The method as recited in claim 20 wherein the compressible member is disposed within the internal chamber such that an outside surface of the compressible member is positioned adjacent an inside surface of the internal chamber and the plurality of openings.

25. The method as recited in claim 20 wherein the dampening device further comprises a sleeve interposed between an inside surface of the internal chamber and an outside surface of the compressible member.

26. A pulsation dampening system for controlling fluid pulsations within a fluid flow stream, the system comprising:
    a fluid chamber for transporting a fluid flow stream therein, the fluid chamber defined by a cylindrical wall structure, wherein the fluid flow stream is transported within the fluid chamber in a direction that is substantially perpendicular to the cylindrical wall structure;
    a number of pulsation dampening devices disposed within and mounted to the fluid chamber, each device comprising a housing including a cylindrical wall structure extending between axially opposed housing ends, the wall structure having a plurality of openings disposed therethrough and being curved between the housing ends, wherein the curved wall structure is attached to a curved inside surface of the fluid chamber cylindrical wall structure in a position that is substantially perpendicular to and immersed within the fluid flow stream within the fluid chamber, the device including an internal chamber defined by the device wall structure and having a gas-filled elastomeric bladder disposed within the internal chamber, wherein the number of pulsation dampening devices are arranged end-to-end circumferentially around the inside curved surface of the fluid chamber cylindrical wall structure.

27. The system as recited in claim 26 wherein the pulsation device cylindrical wall section has a radius of curvature that is approximately that of the inside surface of the fluid chamber cylindrical wall structure.

28. The system as recited in claim 26 wherein the bladder has a curved shape to match the curved wall structure before insertion into the internal chamber.

* * * * *